(12) United States Patent
Reza

(10) Patent No.: US 6,618,035 B1
(45) Date of Patent: Sep. 9, 2003

(54) INTERFACE UNIT BETWEEN A USER AND AN ELECTRONIC DEVICE

(76) Inventor: Yves Jean-Paul Guy Reza, 3 rue Cognacq-Jay, 75007 Paris (FR)

( * ) Notice: Subject to any disclaimer, the term of this patent is extended or adjusted under 35 U.S.C. 154(b) by 0 days.

(21) Appl. No.: 09/687,321

(22) Filed: Oct. 13, 2000

(30) Foreign Application Priority Data

Oct. 15, 1999 (FR) .............................................. 99 12891
Nov. 9, 1999 (FR) .............................................. 99 14061

(51) Int. Cl.$^7$ ................................................ G09G 5/08
(52) U.S. Cl. ........................ 345/158; 345/207; 348/734
(58) Field of Search ................................ 345/156–158, 345/207; 463/36–38; 348/734

(56) References Cited

U.S. PATENT DOCUMENTS

| | | | |
|---|---|---|---|
| 4,591,841 A | 5/1986 | Gunderson et al. | ......... 345/180 |
| 3,680,078 A | 7/1992 | Baskin et al. | ............... 345/180 |
| 5,394,168 A | 2/1995 | Smith, III et al. | .......... 345/156 |
| 5,420,607 A | 5/1995 | Miller et al. | ................. 345/156 |
| 5,646,650 A | 7/1997 | Miller et al. | ................. 345/179 |
| 6,081,255 A | 6/2000 | Narabu | ........................ 345/158 |
| 6,489,945 B1 * | 12/2002 | Gordon | ....................... 345/158 |
| 6,501,515 B1 * | 12/2002 | Iwamura | ..................... 348/734 |
| 6,501,516 B1 * | 12/2002 | Clapper | ...................... 348/734 |
| 6,545,661 B1 * | 4/2003 | Goschy et al. | .............. 345/158 |

FOREIGN PATENT DOCUMENTS

DE 19757674 6/2000

* cited by examiner

Primary Examiner—Richard Hjerpe
Assistant Examiner—Frances Nguyen
(74) Attorney, Agent, or Firm—Piper Rudnick

(57) ABSTRACT

Interface unit between a user and an electronic device comprising a control logic and a cathode screen (3) with a scanning facility where the luminous spot successively occupies all the points of the screen according to a predetermined scanning cycle. The control box has at least two lighting sensors of neighbouring and parallel axes which facilitate, by means of a microprocessor, the calculation of the position of a zone which is targeted by the control box on the screen and the transmission of information to the electronic device.

22 Claims, 5 Drawing Sheets

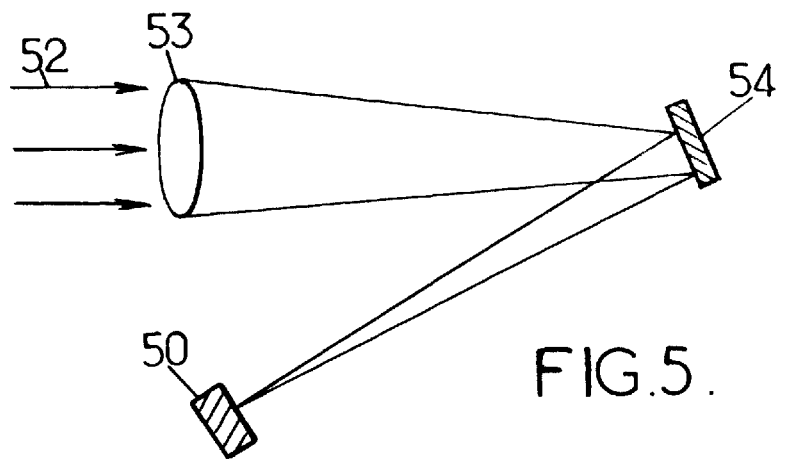
FIG.5.
FIG.6.
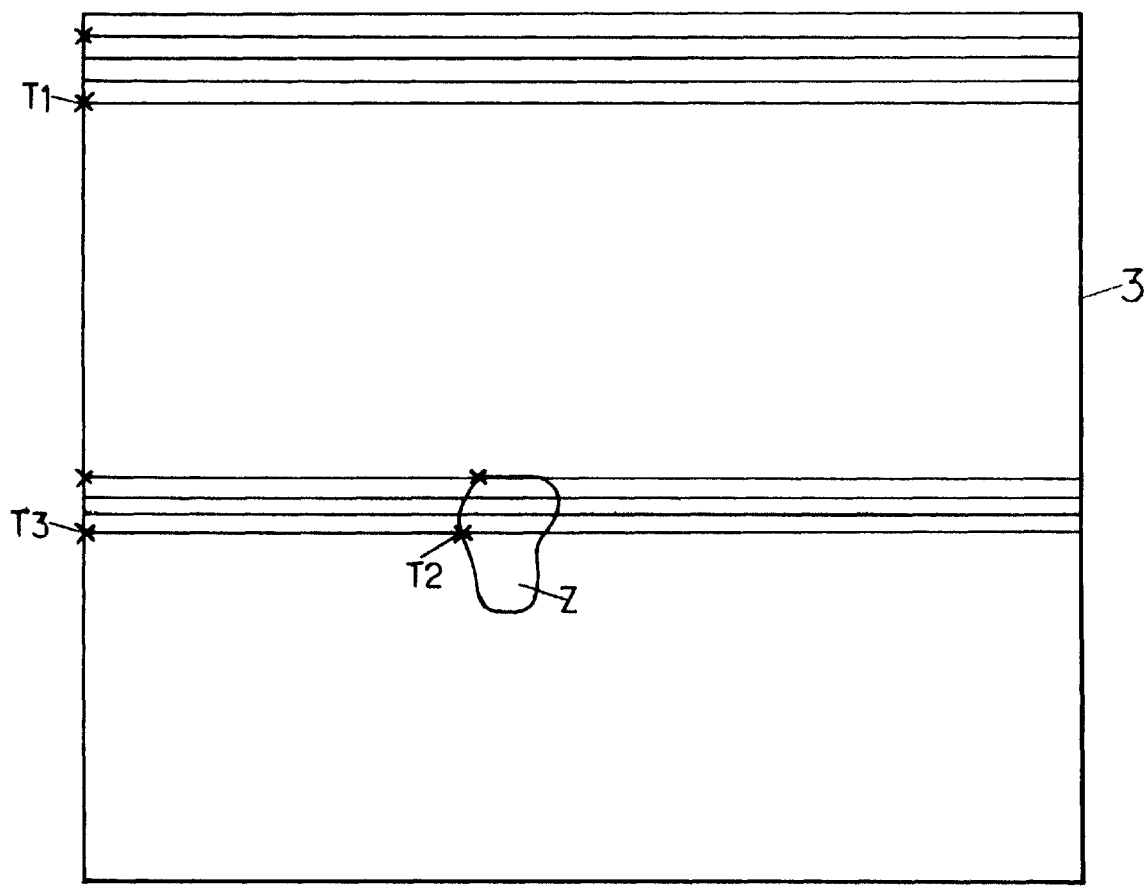

INTERFACE UNIT BETWEEN A USER AND AN ELECTRONIC DEVICE

FIELDS OF INVENTION

The present invention relates to an interface unit between a user and an electronic device comprising a control logic and a rectangular cathode screen with a scanning facility.

BACKGROUND IF THE INVENTION

A cathode screen of this nature is scanned by a luminous spot which successively occupies all the points of the screen according to a pre-determined scanning cycle.

The cathode screens usually found are essentially rectangular-shaped and have for example approximately 625 lines on their width and 800 points per line. The luminous spot moves successively on all the points of each line and travels across a line at a scanning speed of 64 micro-seconds for example.

The invention is used in particular for remote controls for controlling the operation of a television or a video recorder. Operation control of these devices by means of the generally found remote controls is fastidious insofar as the command option windows must be successively displayed on the screen so that a user can select one of the operating modes of the television or video recorder.

SUMMARY OF THE INVENTION

The object of the present invention is to find a solution to the above drawbacks by creating an interface unit which facilitates simple control of an electronic device and whereby this is achieved by simple, efficient and cost-effective means.

For this purpose, according to the invention an interface unit of the type in question comprises
  a control box consisting of:
    at least two lighting sensors adapted to the scanning of the screen by the luminous spot:
      a lighting sensor D1 which has a detection field comprising at least the upper left section of the screen;
      a lighting sensor D2 which has a detection field limited to a reduced zone Z of the screen;
    a wide-band amplifier and a high-pass filter for each of the lighting sensors;
    means of detection of the appearance of the luminous spot in the detection field of each of the sensors in order to generate a pre-determined logical signal;
    means of logical and arithmetical processing of the logical signals in order to calculate the position of the target zone Z on the screen at least on the basis of firstly the instant of appearance of the logical signal corresponding to the lighting sensor D1 whose detection field comprises at least the upper left section of the screen and which corresponds to the beginning of the scanning of the image, and secondly the instant of appearance of the logical signal corresponding to the lighting sensor D2 whose detection field is limited and which corresponds to the passage of the luminous spot in front of the target zone Z;
    a transmission chain from the box towards the electronic device, the device having a logic adapted to be modified by the information received,
and wherein the control box is placed at a distance from the cathode screen.

Therefore, owing to its facilities, the interface unit easily facilitates the designation of a point or the selection of an object on a cathode screen at a distance.

In preferred embodiments of the interface unit according to the present invention, one and/or other of the following facilities are also used:
  the means of logical and arithmetical processing of the logical signals calculates the position of the target zone Z on the screen on the basis of the time difference between firstly the instant of appearance of the logical signal corresponding to the lighting sensor D1 whose detection field comprises at least the upper left section of the screen and which corresponds to the beginning of scanning of the image, and secondly the instant of appearance of the logical signal corresponding to the lighting sensor D2 whose detection field is reduced and which corresponds to the passage of the luminous spot in front of the target zone Z;
  the detection field of the sensor D1 contains the whole screen and the means of logical and arithmetical processing of the logical signals calculate the position of the target zone Z on the screen on the basis, furthermore, of the instant of appearance of the logical signal corresponding to the lighting sensor D1 on a line which also corresponds to the passage of the luminous spot in front of the target zone Z;
  the means of logical and arithmetical processing are also capable of:
    memorizing the instants of appearance of the logical signals corresponding to the lighting sensor D1 for several lines which correspond to the beginning of the scanning of the screen,
    memorizing for several lines of scanning the instants of the signals corresponding to the lighting of the sensors D1 and D2 by the passage of the luminous spot on the same line;
  the lighting sensor D1 and the lighting sensor D2 have parallel, close axes;
  the lighting sensor D1, whose detection field comprises at least the upper left section of the screen, has a lighting detector and a focusing device in order to improve the sensitivity of the sensor;
  the focusing device is chosen from a conical mirror and a system of optical lenses;
  the lighting sensor D2, whose detection field is reduced, has a lighting detector and a focusing system in order to focus the light coming from the target zone Z on the active surface of the detector;
  in the upper left section, the screen has a portion with a reduced surface, and which is light in color;
  the electronic device also has means of controlling the screen in order to display on the screen a graphic effect in a position in relation to the target zone Z;
  the control box has means which can be selectively activated by the user, and whereby the result of the action is transmitted to the electronic device by the box;
  the selectively activated means of control are chosen among keys, potentiometers, pressure sensors, angle sensors, position sensors, gyroscopes, at least one vocal command and at least one joystick;
  the control box transmits information to the electronic device when the position of the target zone Z has changed by a pre-determined minimum value;
  the control box also has means of identification adapted so that the electronic device recognizes the control box, whereby these means of identification selectively generate identification data of the box which is sent to the electronic device;

several control boxes communicate with the electronic device and the means of control of the device of each control box transmit their information a certain number of times to the electronic device, in order to increase the probability of the electronic device receiving the information emitted by each box without interference with the information emitted by the other boxes;

several control boxes communicate with the electronic device and the means of control of the device of each control box transmit their information to the electronic device, being synchronised in relation to the beginning of the image displayed on the screen, and at instants defined by intervals specific to each box in relation to the beginning of the image;

the electronic device has means which cause the transmission of new information by at least one of said control boxes;

the means causing the transmission of new information consist in that at least one part of the screen displays a pre-determined sequence of luminous intensities;

the emitter and the receiver communicate by waves;

and the emitter and the receiver are linked by a transmission cable;

the control box has means of measuring and memorizing periodically the lighting time of the sensor D2 by the luminous spot in order to facilitate detection of approaching or distancing of the control box from the screen by the measurement of the variation in the lighting time of the sensor by said luminous spot;

the control box has, firstly, two lighting sensors D2, D3 of parallel, close axes and having detection fields which are each limited to a reduced zone Z, Z' of the screen and, secondly, supplementary means of logical and arithmetical processing in order to measure the position of the two distinct zones Z, Z' on the screen and to facilitate the calculation of the rotation angle of the control box in relation to the common axis of said lighting sensors D2, D3.

Other characteristics and advantages of the invention will become apparent in the course of the following detailed description of one of its embodiments which is given by way of a non-exhaustive example and relates to the annexed drawings.

BRIEF DESCRIPTION OF THE DRAWINGS

In the drawings:

FIGS. 2 to 5 schematically illustrate the lighting sensors of the control box of FIG. 1;

FIG. 6 illustrates the instants of lighting of the luminous spot which are detected by the sensors in order to facilitate the calculation of the target position on the screen;

MORE DETAILED DESCRIPTION

The interface unit according to the present invention is for example in the form of a remote control box 1 which is intended to be used by an operator in order to control the operation of an electronic device 2 which is associated with a cathode screen 3 with a scanning facility.

The electronic device 2 enables information to be displayed on the cathode tube screen 3 such as a fixed or animated video image, text or menus or similar. On the basis of the information displayed on the cathode screen 3, the operator performs a choice and/or captures the data with the assistance of the control box 1 which is placed at a distance from the screen 3 and which will be described below.

The control box 1 has two lighting sensors D1 and D2 such as photo-diodes whose axes can be parallel and neighbouring, but whose capture angles are different.

The detection field of one of the detectors, for example of the lighting sensor D1, is wide and contains the whole screen 3, whereas the detection field of the lighting sensor D2 is reduced and is limited to a selected zone Z of the screen in the interior of the surface of the screen. In the event of the zone Z being in the form of a square or a rectangle, the relationship of the sides of the zone Z on the sides of the screen 3 will be approximately included between for example 0.1 and 0.01. According to a variation, the lighting sensor D1 has a detection field which only contains the upper left section of this screen.

The lighting sensor D1 is adapted in such a way that its detection field comprises the whole screen 3, or in a variation only the upper left section of the screen, even when the user targets the lower right section of said screen with his remote control box 1.

Figure 2:
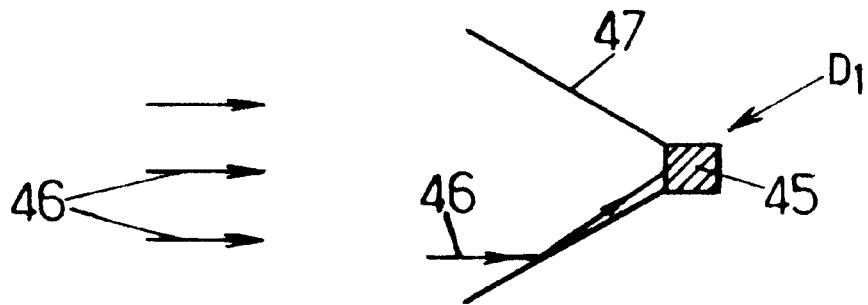

The lighting sensor D1 is constituted by a simple lighting detector or—as is shown particularly in FIG. 2—it is constituted by a lighting detector 45, upward from which (in relation to the direction of displacement of the luminous rays 46) there is a conical mirror 47. This mirror defines an angle enabling the concentration of the incident rays towards the detector 45.

In a variation, the conical mirror 47 can be replaced by a system of large-angle optical lenses in order to focus the luminous rays 46 on the active surface of the lighting detector 45.

Figure 3:
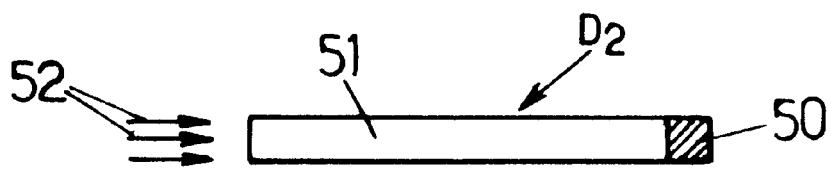
Figure 4:
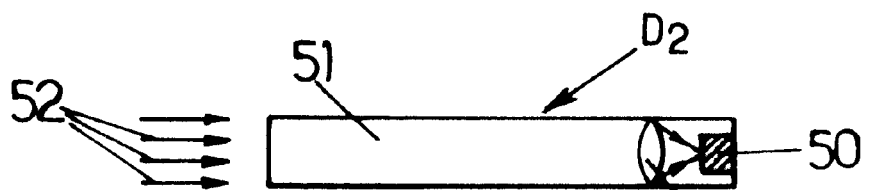

The lighting sensor D2 is constituted, as shown in FIG. 3, by a lighting detector 50 placed possibly at the end of a narrow tube 51, the interior surface of which absorbs the luminous rays 52. According to a variation shown in FIG. 4, apart from the detector 50 and the tube 51, the sensor D2 comprises a system of optical lenses 53, which can be assimilated to a convex lens. This system facilitates an improvement in the sensitivity and directivity of the sensor by focusing on an active part of the detector 50, because the luminous rays 52 coming from the target zone Z are captured by the system whose surface is markedly superior to the detector. According to a further embodiment shown in FIG. 5, the luminous rays 52 coming from the target zone Z are captured by the lens system 53 and are then reflected on a mirror 54 before being sent back onto the detector 50. The mirror 54 can be formed by a plan mirror. Thus, the focal length of the focusing device which corresponds to the lenses 53 and to the mirrors 54 is very much superior to the dimensions of the active part of the detector 50, in such a way that this focusing device ensures for the detector 50 a function which is analogous with that of a telephoto lens in photography.

In all cases, the luminous rays 46 and 52 come from the cathode screen 3 placed at a distance in such a way that these rays can be regarded as coming from a common, distant source, and as essentially parallel between themselves if the axes of the sensors D1 and D2 are close and parallel.

The signal supplied by the sensors D1 and D2 consists of a white noise and a current proportional to its lighting. For example, one can use the amplified photo-diode of Texas Instrument, reference TSL252.

Each sensor is connected to a unit carrying out the following functions:

high-pass filter with a cut-out frequency of 10 KHz and 6 db/dimming octave, which enables the influence of daylight and its variations to be eliminated, as well as the effect of artificial lighting, which typically supply a light with an intensity which is modulated with a frequency of 100 or 120 Hz depending upon the country;

wide-band amplification.

These two functions can be realized for example by means of amplifiers which are operational with wide band and classically assembled. One can, for example, use the amplifier manufactured by STMicroelectronics under reference TSH94.

The amplification of the signal must have the highest possible passing band in order to provide a position calculated with great precision. The photo-diodes have a very fast response time in the order of micro-seconds. It will in any case be necessary to limit the passing band of the amplifiers to the useful passing band of the signal, which is a few hundred kilohertz at the most, if the sensors D1 and D2 are capable of supplying signals or noise at a higher frequency.

The detection of the luminous spot in the capture field of each lighting sensor D1 and D2 is achieved by means of comparators supplied by the alternating signal supplied by the amplification stages and of which the reference tension of which is set at a higher level than that of the surrounding noise.

For example, each comparator is of the LM329 type, of which the reference tension is fixed at 6 db above the level of white noise.

The two comparators are linked to a micro-controller 60 which facilitates the measurement of the instant when the logical signal corresponding to each sensor has changed.

The micro-controller must facilitate time measurements with a precision of 0.5 or 1 micro-second on several logical signals simultaneously. It is possible to use a micro-controller manufactured by STMicrotechnics, reference ST7, which comprises sufficient means of acquisition of temporal data of input and of capacity of live memory, and of which the maximum speed of processing facilitates, in less than 64 micro-seconds, the processing of the logical signal associated with the sensor D1 as well as the logical signal associated with the sensor D2.

For example, one will be able to use a micro-controller of the range ST7 which has the following characteristics:

live memory of 384 octets (which facilitates the memorization of tens of measurements of instants of appearance of the logical signals associated with the beginning of the lighting of the sensors D1 and D2), two timers of 16 bits, each having two channels, micro-controller clock driven by a quartz by reason of the precision required for time measurements.

The micro-controller is for example configured in the following way:

three pins are used to receive logical signals and to trigger off interruptions:

one pin for the logical signal corresponding to the beginning of the lighting of the sensor D1, one pin for the logical signal corresponding to the beginning of the lighting of the sensor D2, one pin for the logical signal corresponding to the absence for 1 to 2 milliseconds of the signal corresponding to the lighting of the sensor D1. This application will be described in greater detail later in the description;

the first timer has its two channels configured for acquisition of data, which enables the micro-controller to automatically memorize in its memory the instant of appearance on its pins of each of the logical signals associated with the beginning of the lighting of the sensors D1 and D2 and also enables an interruption to be generated for each of the logical signals;

the second time generates periodic interruptions and serves as a system clock;

Some video signals have a line frequency which is much higher than that of the standards PAL, SECAM or NTSC (this being 16 KHz, which corresponds to a line duration of approximately 64 micro-seconds). For example, the screens of computer monitors have line frequencies of 60 KHz or more, which corresponds to a line duration of 16.7 micro-seconds or less.

In order to be able to carry out the time measurements and position measurements with the preceding means, one reverts to the case of a line frequency in the vicinity of 16 KHz, by selecting by means of a logical gate assembly only one logical signal out of N for the logical signals corresponding to the beginning of lighting of the sensors D1 and D2.

For example, if the line frequency is 60 KHz, one will only select one signal out of 4 and one will thus go back to the case of a line frequency of 15 KHz.

The micro-controller is linked to the user interface, enabling the user to indicate that the box must carry out a position measurement of the zone Z.

According to a first embodiment of the invention, when one wishes to know the selected position of the zone Z of the screen, and when the detection field of the sensor D1 only contains the upper left section of the screen, the micro-controller proceeds as follows (by reference to FIG. 6):

it monitors the logical level of the signal coming from the lighting sensor Di, whose detection field includes only the upper left section of this screen;

it detects the existence of a period of time without detection of a signal which corresponds at least to the period of time necessary for the passage of the spot from the lower right corner of the screen to the upper left corner of this screen. In a way which is known in itself, the period of time corresponding to the passage of the spot from the lower right corner of the screen to the upper left corner of this screen varies between 1 and 2 milliseconds in accordance with the European or American television standards (PAL, SECAM, NTSC), and no new line or image is thus displayed on the screen during this period. Thus, when the detection field of the sensor D1 includes only the upper left corner of the screen, and knowing that the spot scans one line of the screen in around 64 micro-seconds, the micro-controller will be able to detect the absence of the spot in the detection field of the sensor D1. When the period of absence of the spot in the detection field of the sensor D1 is at least equal to 1 or 2 milliseconds, the micro-controller can thus know that the re-appearance of the spot will necessarily take place in the upper left corner of the screen. In the same way, when the detection field of the sensor D1 includes the whole screen, and knowing that the spot still scans one line of the screen in around 64 micro-seconds, the micro-controller will also be able to detect the absence of the spot in the detection field of the sensor D1. When the period of absence of the spot in the detection field of the sensor D1 is at lest equal to 1 or 2 milliseconds and the image displayed does not contain a number of very dark lines, such that the sensor D1 does not detect the spot during this same period of 1 to 2 milliseconds, the micro-controller can thus know that the re-appearance of the spot will take place necessarily in the upper left corner of the screen. This detection of the absence of lighting of the sensor D1 for a period of at least 1 to 2 milliseconds can be directly carried out by the micro-controller or by an adapted electronic circuit arranged at the exit of the comparator associated with the sensor D1, whereby this circuit thus sends a signal to the micro-controller;

it then detects the change of logical level generated by the comparator supplied by the signal of the lighting sensor D1 corresponding to the return of the spot to the upper left corner. In this case, the micro-controller assigns to this first signal the instant T1 which corresponds to the beginning of the scanning of a new image. However, without exiting the scope of the invention, the micro-controller can also systematically ignore the first signals emitted by the sensor D1, for example the first three signals which correspond to the scanning of the first three lines, and assign to the forth signal the instant T1 which thus corresponds to the start of scanning of a new image (FIG. 6). In fact, it can prove useful to ignore at least the first three lines of scanning of the screen, given the speed fluctuations of the spot during the first scans. In the remainder of the description, the signal corresponding to the beginning of scanning of the image is understood to be not the signal emitted by the scanning of the first line of the screen, but the first signal emitted by the sensor D1 which will be detected and memorized by the micro-controller 60;

it then detects the instant T2 of the change in logical level generated by the comparator supplied by the signal of the sensor D2 whose detection field is limited to the selected zone Z. As in the preceding case, the micro-controller can assign the instant T2 to the change of level which corresponds to the beginning of the passage of the spot in the target zone, that is to say to the first line of the target zone, or to the change in logical level corresponding, for example, to the forth passage of the spot in the target zone Z ignoring consequently the first three signals emitted by the sensor D2.

The arithmetical processing means of the box or of the electronic device 2 thus calculate the position of the start of the target zone Z on the basis of the instants T1 and T2 according to the following principle:

the starting position of this zone begins at the line whose number is obtained by the following calculation:

Entire value [(T2-T1)/Tline]

whereby Tline is the duration of scanning of a line by the spot;

within this line, of which the number has just been calculated, the starting position of the zone Z expressed as a percentage of the line length is given by the following calculation:

[(T2-T1) Modulo(Tline)]/Tline whereby (T)Modulo(Tline) is the remainder of the division of T by Tline.

It will be noted that:

the operation Entire value [(T2-T1)/Tline] amounts to eliminating from (T2-T1) the duration which corresponds to a line fraction. Consequently, Entire value [(T2-T1)] is directly comparable with and equal to the duration between firstly the start of the lighting of the sensor D1 at the beginning of the scanning of the image (instant Ti) and secondly the start of the lighting (left side of the screen 3) of the first scanning line which lights the sensor D2;

the operation Module(Tline) amounts to subtracting from (T2-T1) the duration corresponding to the scanning of the lines of the screen 3 before the sensor D2 is lit. Consequently, [(T2-T1) Module(Tline)] is directly comparable with and equal to the duration going by in the course of the first line of scanning which lights the sensor D2 between firstly the start of the lighting (left side of the screen) and secondly the start of the lighting of the sensor D2.

Figure 1:
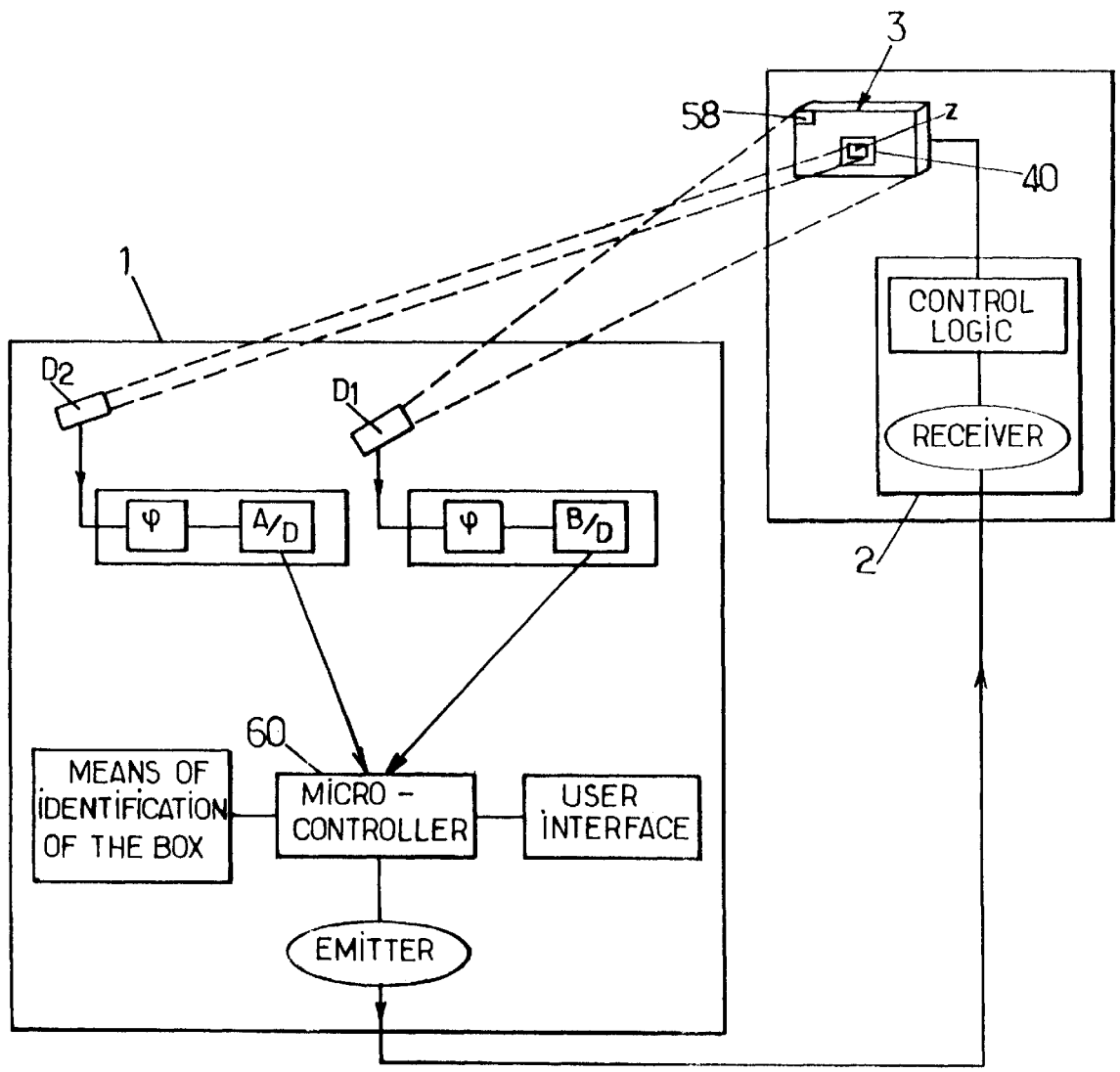
FIG. 1 is a schematic view with block diagrams of the interface unit according to the present invention, comprising a control box.

In order to increase the precision and reliability of the detection of the start of the image display on the screen 3, the electronic device maintains in display at all times a portion 58 which is light in color (FIG. 1) in the upper left corner of the image displayed on the screen 3. This portion has reduced dimensions in relation to the screen and is for example in a square form, the side of which is equal to 2 to 5% of the value of the diagonal of the screen. The portion 58 is preferably white in color.

According to an alternative embodiment of the invention, when one wishes to know the position of the target zone Z on the screen and when the detection field of the sensor D1 contains the whole screen, the micro-controller 60 can also proceed as follows (FIG. 6):

it detects and memorizes the instants T1 and T2 as previously described;

it detects, furthermore, the instant T3 of the change of logical level which corresponds to the start of the lighting of the sensor D1 by the same scanning line which also lights the sensor D2 (instant T2). In order to do this, the micro-controller 60 validates solely the memorization of the instant T3 if the luminous spot also lights the sensor D2 in a period of time less than the duration of total scanning of the line, that is to say around 64 micro-seconds.

The arithmetical means of processing of the box or of the electronic device 2 thus calculate the position of the start of the target zone Z on the basis of the instants T1, T2 and T3 according to the following principle:

the position of the start of this zone begins at the line, of which the number is given by the following calculation:

Entire value [(T3-T1)/Tline]

inside this line, of which the number has just been calculated, the position of the start of the zone Z, expressed as a percentage of line length, is given by the following calculation:

(T2-T3)/Tline where "Tline" still corresponds to the duration of scanning of one line by the spot.

Figure 7:
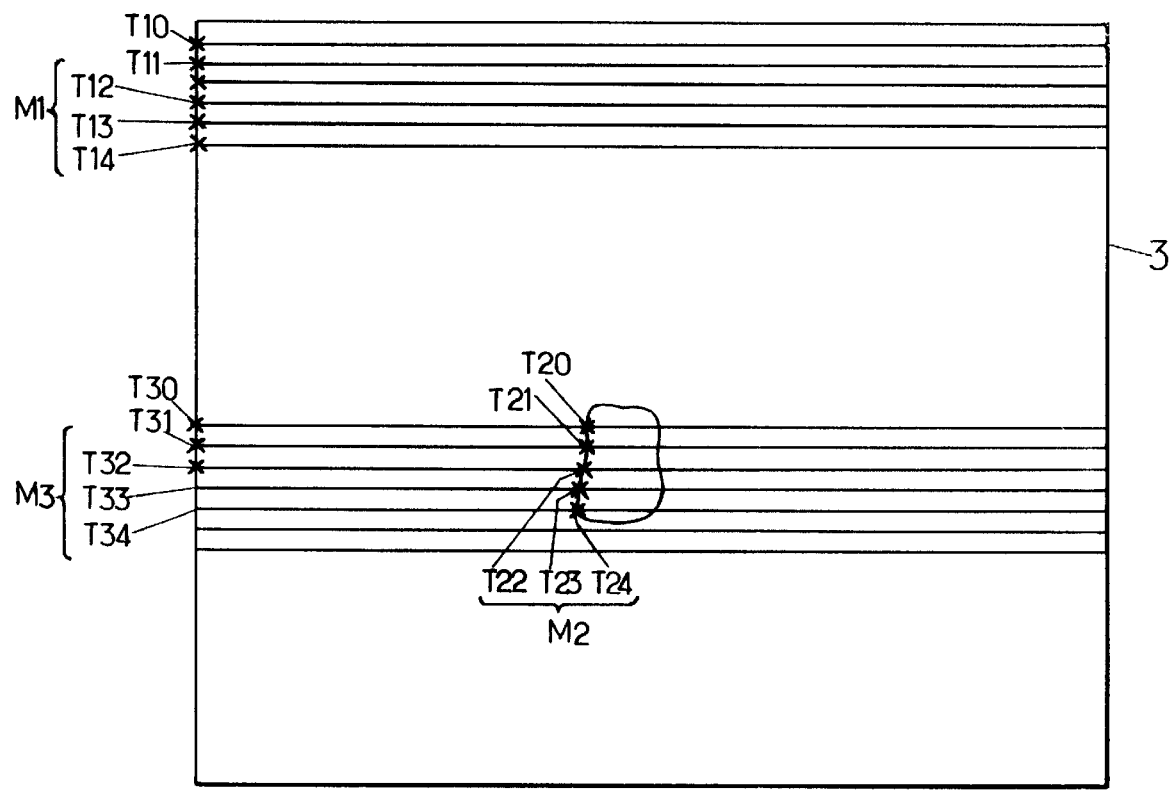
FIG. 7 illustrates an alternative embodiment of the calculation method of the target position on the screen.

According to a further embodiment shown in FIG. 7, when the user wishes to know the position of the target zone Z, the micro-controller can memorize several instants of lighting of the sensors D1 and D2. In this case, the micro-controller can proceed as follows:

it systematically ignores the instants of the first signals emitted by the sensor D1 and by the sensor D2, for example the first two lighting instants T10, T11; T20, T21 and T30, T31 for each of the sensors D1 and D2;

it memorizes the instants T12, T13 and T14 of the signals corresponding to the lighting of the sensor D1 for several lines of scanning corresponding to the beginning of the image (for example the signals corresponding to the first three lines of scanning of the screen which are taken into account by the micro-controller 60);

it calculates the average M1 of the instants T12, T13 and T14 thus memorized;

it memorizes the instants T32, T33 and T34 of the signals corresponding to the lighting of the sensor D1 for several lines of scanning which correspond to lighting instants T22, T23 and T24 of the sensor D2 (for example the signals corresponding to the first three lines of scanning of the screen which light the sensor D2 and which are taken into account by the micro-controller 60);

it calculates the respective averages M2 and M3 of the instants T22, T23, T24 and of the instants T32, T33 and T34 thus memorized.

The arithmetical means of processing of the box or of the electronic device 2 thus calculate the position of the start of the target zone Z on the basis of the averages previously calculated according to the following principle:

the position of the start of this zone begins at the line, of which the number is given by the following calculation:

Entire value [(M3-M1)/Tline]

whereby Tline is the duration of scanning of one line by the spot, inside this line, of which the number has just been calculated, the position of the start of the zone Z, expressed as a percentage of line length, is given by the following calculation:

[(M2-M3)/Tline]

One can in fact check that this method of calculation is compatible with the preceding one:

the position in Y is calculated according to an identical principle, by replacing isolated values by averages of these same values, the position in X is calculated on the basis of an average of durations between the start of the lighting of the sensor D1 and the start of the lighting of the sensor D2 of one same scanning line. The previous remark concerning the significance of the operation Modulo (Tline) shows that the position in X is calculated on the basis of an average of values analogous in their nature with those provided by the Modulo operation.

Of course, this mode of calculation supposes that the screen 3 in its entirety is in the field of the sensor D1.

One also understands that the micro-controller 60, according to the first embodiment, can memorize several instants Ti and T2 and proceed with the calculation of the position of the target zone Z solely with the averages M1 and M2 and by applying the mode of calculation involving the Modulo operation. In the same way, when the detection field of the sensor D1 contains the whole screen, the micro-controller will be able to carry out the calculation of the position in X of the target zone on the basis of M2 and M1 and applying the Modulo operation and/or on the basis of M3 and M1 and likewise proceed with an average of the results obtained by these two modes of calculation in order to determine the position in X of the target zone Z.

The imprecision brought about by these averages is very much reduced, having regard to the number of lines of a television image (250 to 280 useful lines typically in PAL, SECAM, NTSC each ⅟50 or ⅟60 of a second) and the improvement in the stability and reproducibility of the measurements brought about by these averages.

The capacity of the means of logical and arithmetical processing of the box or of the electronic device 2 is minimized by the reduction in the number of signals which are transmitted to them and by the reduction of the amount of information emitted to the electronic device in order to realize the position of the target zone Z by a cursor. This also enables the energy consumption used by these means of processing to be minimized.

For example, there is no emission of information to the electronic device if the position of the target zone has not changed by a pre-determined percentage and/or during a pre-determined period of time.

The graphic cursor 40 (FIG. 1) displayed by the system 2 on the screen 3 in order to materialize the position targeted by the user can take the form of any graphical effect which can be visualized by the user, such as a change of color or a change in form of an object or else the flashing display of some geometrical form.

The control box according to the present invention also has means of control of the electronic device associated with the screen. The means can be positively activated by the user, such as keys, potentiometers, pressure sensors, a vocal command or one or more joysticks enabling the user to transmit information to the electronic device 2. When the electronic device corresponds for example to a video game, it is a question of indicating a displacement or simulating a shot or, when the device corresponds to a television, it is a question of the operator selecting at a distance an option from a television transmission menu.

Figure 8:
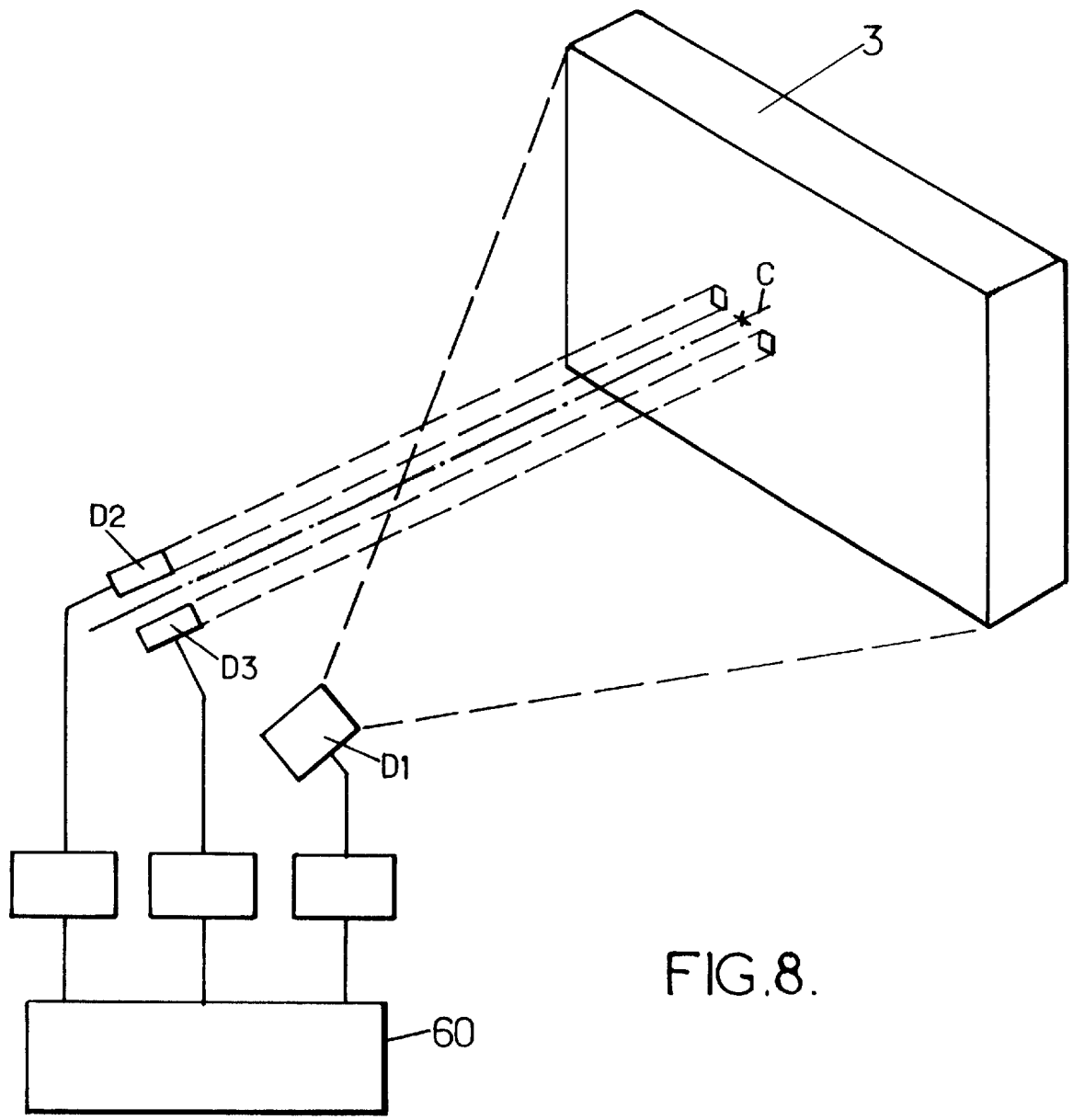
FIG. 8 illustrates an alternative embodiment of the control box comprising two lighting sensors with reduced detection fields.

According to a further embodiment of the invention shown in FIG. 8, the control box can comprise two different sensors D2 and D3 with parallel, neighbouring axes, having fields of detection which are each limited to a reduced area Z, Z' of the screen. The presence of the second lighting sensor D3 advantageously enables the box to measure the position of the two distinct zones Z and Z' on the screen 3, and thus to deduce therefrom a rotation angle of the box in relation to the common axis C of the sensors D2 and D3. The management of two sensors D2 and D3 can for example be realized as follows:

each sensor D2 and D3 is associated with an amplification and filtering chain, as well as a logical comparator, (if the micro-controller 60 is not fast enough to process in the course of a line of scanning all the logical signals generated by the sensors), an assembly of logical gates and flip-flops enables presentation to the microprocessor 60 alternatively of the logical signals coming from the comparators associated with each of the sensors D2 and D3 and the feeding to the microprocessor of the indication of the sensor D2 or D3 to which the signal corresponds, the program of the micro-processor 60 is adapted to process this alternation of signals or the signal of the new sensor D3 and to calculate the position of the two zones Z and Z'. The micro-controller 60 or the electronic device 2 can thus deduce therefrom the position of the middle area between these two zones Z and Z' and the angle of rotation of the segment constituted by these two zones Z and Z' in relation to a reference axis formed by the common axis C of the two sensors D2 and D3.

According to a variation, several control boxes can be associated with a single electronic device, particularly when several players are using the same video game at the same time. In this case, it is necessary for each of the control boxes to have means of identification in order to enable the electronic device to recognize each of these boxes.

In addition, each of the control boxes can also have means of re-emission of the information to be transmitted to the electronic device in order to minimize the probability of two control boxes emitting simultaneously and thus to increase the probability of the information being correctly received by the electronic device.

The control box can also contain a combination of means of identification which are electrically accessible by the micro-controller 60, such as electronic memories containing a serial number or a set of electrical contacts such as a set of interrupters which conditions the logical level on entry pins of the micro-controller 60. The information supplied by these means of identification can be taken into account by the micro-controller 60 in the calculation of the information to be transmitted, particularly in the following ways:

periodic sending or sending linked to the sending of the position information of the identification information or of information coming from this identification information (for example, sending of part of the identification information linked to the sending of the position information), sending of the position information at an instant defined as a function of the identification information.

Moreover, each of the control boxes can also:

be synchronized in relation to the start of the image displayed on the screen 3, since they detect this instant and can synchronize themselves on this instant owing to the internal clock of the micro-controller 60, emit at instants defined by an interval specific to each box in relation to this start of image, whereby the interval is defined as a function of means of identification of the control box.

In an alternative embodiment, the control box can detect whether the user is appreciably distancing himself from or approaching the screen. In fact, when the sensor D2 targets a zone which is totally contained in the screen, the duration of lighting of this sensor varies in the same sense as the distance separating the sensor D2 from the screen 3. By measuring the sense and intensity of the variation of this duration of lighting over, for example, the last 20 images observed, it is possible to assess whether the user has distanced himself or approached the screen 3 in an appreciable way. With the duration of lighting of the sensor D2 for each line being of the order of a few micro-seconds and the typical variations of this duration being a few per cent, a particular method of measuring the lighting time is useful.

For this, one will use the measurement of the voltage on the terminals of a condenser, which is a function strictly increasing of the duration of the charge, for example according to the following method:

the condenser is initialized by a short-circuit of its terminals realized by means of an MOS transistor controlled by the micro-controller 60 before the start of each image;

once per image, during a line of scanning of the screen selected by the micro-controller 60 (for example the third line), the condenser is charged by a current or constant-voltage controlled by another MOS transistor which lets the charge current pass solely for the duration of the logical signal constituted by a logical AND of the two following signals:

the logical signal supplied by the comparator associated with the sensor D2 (assuming that it is at 1 when the sensor D2 is lit), a logical signal generated by the micro-controller 60, of which the level is at 1 for the entire duration of the line of scanning during which the measurement must take place (this signal can for example be a signal of duration moreorless equal to the duration of two lines of scanning and which is initiated by the lighting of the sensor D2 in the course of the scanning line which precedes that in the course of which the measurement will take place).

The charge current of the condenser must be sufficiently intense (several milliamperes or tens of milliamperes) so that no significant errors are introduced during the subsequent period of waiting and of measurement of voltage at these terminals.

The measurement of the voltage at its terminals, which is a function strictly increasing of the duration of the charge, is thus realized once per image (for example as soon as the end of the lighting has been detected) by means of an analogue/numerical converter integrated into the micro-controller 60. This measurement is typically realized in a few microseconds by the current micro-controllers. The ST7 range includes micro-controllers equipped with such converters.

The one or more control boxes and the electronic device have respectively an emitter and a receiver of information, which communicate by a cable or by waves such as electromagnetic waves (particularly infra-red or radio) or acoustic waves (particularly ultra-sound).

Furthermore, the electronic device can have means of indicating to at least one of the control boxes that the signals emitted by this box are not comprehensible, or that the device is waiting for information of a very specific type on the part of the remote control box. The signals emitted by the boxes may be incomprehensible for various reasons, and in particular when several boxes are emitting simultaneously. The device can request information of different types for example in the following cases:

request to send (or to finish send) of information generated by the positively and selectively activated means associated with the remote control box, request to send (or to finish send) of identification information associated with the remote control box, request for more frequent or less frequent sending of position information, request to send position information with complementary processing such as averages realized over several images in order to improve the precision of the information (in return for a more reduced sending frequency of this information).

The requests for information of different types can be selectively addressed to one or several boxes.

The means of indication can for example consist in a non-emission of an image by the cathode tube or by a selected section of the cathode tube for a pre-determined period of time. This period of time can be short enough to ensure that there is no image suppression for the human eye, but can be long enough to ensure that this suppression is detectable by the control boxes. The period of time can for example correspond to non-emission of an image during an image, namely $\frac{1}{50}$ or $\frac{1}{60}$ of a second.

These means of indication can also be the sending of a pre-determined sequence of luminous intensities which can be assimilated to images or parts of images, which are very illuminated, have average illumination or are poorly illuminated.

What is claimed is:

1. Interface unit between a user and an electronic device comprising a control logic and a rectangular cathode screen with a scanning facility where a luminous spot scans the screen according to a pre-determined scanning cycle, wherein the unit has a control box including:
at least two lighting sensors adapted to the scanning of the screen by the luminous spot:
a lighting sensor D1 which has a detection field comprising at least the upper left section of the screen;
a lighting sensor D2 which has a detection field limited to a reduced zone Z of the screen;
a wide-band amplifier and a high-pass filter for each of the lighting
means of detection of the appearance of the luminous spot in the detection field of each of the sensors in order to generate a pre-determined logical signal;
means of logical and arithmetical processing of the logical signals in order to calculate the position of the target zone Z on the screen at least on the basis of firstly the instant of appearance of the logical signal corresponding to the lighting sensor D1 whose detection field comprises at least the upper left section of the screen and which corresponds to the start of image-scanning, and secondly the instant of appearance of the logical signal corresponding to the lighting sensor D2 whose detection field is reduced and which corresponds to the passage of the luminous spot in front of the target zone Z;
a transmission chain from the box towards the electronic device, the device having a logic adapted in order to be modified by the information received, and wherein the control box is placed at a distance from the cathode screen.

2. Interface unit according to claim 1, in which the means of logical and arithmetical processing of the logical signals calculate the position of the target zone Z on the screen on the basis of the time difference existing between firstly the instant of appearance of the logical signal corresponding to the lighting sensor D1 whose detection field comprises at least the upper left section of the screen and which corresponds to the beginning of scanning of the image, and secondly the instant of appearance of the logical signal corresponding to the lighting sensor D2 whose detection field is reduced and which corresponds to the passage of the luminous spot in front of the target zone Z.

3. Interface unit according to claim 1, in which the detection field of the sensor D1 contains the whole screen and the means of logical and arithmetical processing of the logical signals calculate the position of the target zone Z on the screen, on the basis also of the instant of appearance of the logical signal corresponding to the lighting sensor D1 on a line which likewise corresponds to the passage of the luminous spot in front of the target zone Z.

4. Interface unit according to claim 3, in which the means of logical and arithmetical processing are also able to:

memorize the instants of appearance of the logical signals corresponding to the lighting sensor D1 for several lines which correspond to the beginning of the scanning of the screen, memorize for several lines of scanning the instants of the signals corresponding to the lighting of the sensors D1 and D2 by the passage of the luminous spot on one same line.

5. Interface unit according to claim 1, in which the lighting sensor D1 and the lighting sensor D2 have parallel and close axes.

6. Interface unit according to claim 1, in which the lighting sensor D1 whose detection field comprises at least the upper left section of the screen comprises a lighting detector and a focusing device in order to improve the sensitivity of the sensor.

7. Interface unit according to claim 6, in which the focusing device is chosen between a conical mirror and an optical lens system.

8. Interface unit according to claim 1, in which the lighting sensor D2 whose detection field is reduced comprises a lighting detector and a focusing system in order to focus the light coming from the target zone Z on the active surface of the detector.

9. Interface unit according to claim 1, in which the screen has in its upper left section a portion of reduced surface and which is light in color.

10. Interface unit according to claim 1, in which the electronic device also has means of control of the screen in order to display on the screen a graphic effect in a position in relation to the target zone Z.

11. Interface unit according to claim 10, in which the control box has means which can be selectively activated by the user and of which the result of the action is transmitted to the electronic device by the box.

12. Interface unit according to claim 11, in which the selectively activated means of control are chosen among buttons, potentiometers, pressure sensors, angle sensors, position sensors, gyroscopes, at least one vocal command and at least one joystick.

13. Interface unit according to claim 10, in which the control box transmits information to the electronic device when the position of the target zone Z has changed by a pre-determined minimum value.

14. Interface unit according to claim 10, in which the control box also has means of identification adapted so that the electronic device recognizes the control box, whereby these means of identification selectively generate identification data of the box which is sent to the electronic device.

15. Interface unit according to claim 14, in which several control boxes communicate with the electronic device and the means of control of the device of each control box transmit a certain number of times their information to the electronic device in order to increase the probability of the electronic device receiving the information emitted by each box without interference with the information emitted by the other boxes.

16. Interface unit according to claim 14, in which several control boxes communicate with the electronic device and the means of control of the device of each control box transmit their information to the electronic device, being synchronized in relation to the beginning of the image displayed on the screen, and at instants defined by intervals specific to each box in relation to the beginning of the image.

17. Interface unit according to one claim 15, in which the electronic device has means which cause the transmission of new information by at least one of said control boxes.

18. Interface unit according to claim 17, in which the means causing the transmission of new information consist in that at least one section of the screen displays a predetermined sequence of luminous intensities.

19. Interface unit according to claim 1, in which the emitter and the receiver communicate by waves.

20. Interface unit according to claim 1, in which the emitter and the receiver are linked by a transmission cable.

21. Interface unit according to one claim 1, in which the control box has means of measuring and memorizing periodically the lighting time of the sensor D2 by the luminous spot in order to facilitate a detection of approaching or distancing of the control box from the screen by measuring the variation of the lighting time of the sensor by said luminous spot.

22. Interface unit according to claim 1, in which the control box has firstly two lighting sensors D2, D3 with parallel, close axes, having detection fields which are each limited to a reduced zone Z, Z' of the screen, and secondly supplementary means of logical and arithmetical processing in order to measure the position of the two distinct zones Z, Z' on the screen and to facilitate the calculation of the rotation angle of the control box in relation to the common axis of said lighting sensors D2, D3.

* * * * *